(12) United States Patent
Cave (10) Patent No.: US 6,232,808 B1
(45) Date of Patent: May 15, 2001

(54) IRREGULAR INTERVAL TIMING

(75) Inventor: Ellis K. Cave, Plano, TX (US)

(73) Assignee: InterVoice Limited Partnership, Reno, NV (US)

( * ) Notice: Subject to any disclaimer, the term of this patent is extended or adjusted under 35 U.S.C. 154(b) by 0 days.

(21) Appl. No.: 09/272,630

(22) Filed: Mar. 18, 1999

(51) Int. Cl.[7] ....................................................... G06F 7/02
(52) U.S. Cl. ............................ 327/176; 327/172; 377/26; 377/39
(58) Field of Search .................................. 377/20, 26, 39; 327/176, 172, 173, 174, 175, 291, 299

(56) References Cited

U.S. PATENT DOCUMENTS

| | | | |
|---|---|---|---|
| 4,939,755 | * 7/1990 | Akita et al. | 377/39 |
| 5,086,280 | * 2/1992 | Ohmura et al. | 377/26 |
| 5,680,593 | * 10/1997 | Hiiragizawa | 395/555 |
| 6,002,737 | * 12/1999 | Hevanagundy et al. | 377/20 |

\* cited by examiner

Primary Examiner—Tuan T. Lam (74) Attorney, Agent, or Firm—Fulbright & Jaworski L.L.P.

(57) ABSTRACT

A single large register increments ticks of a high-speed clock. A single compare register is associated with the clock register, the compare register preferably being of equivalent length to the clock register. Successive previously-stored timing values are then loaded into the compare register. Typically the timing values are pre-sorted in chronological order. A comparator monitors the clock register's current value and compares it with the timing value currently loaded in the compare register. As the clock register's value reaches the current timing value in the compare register, an alert signal is generated and sent out to activate a particular timed operation identified by an event ID ("EID") associated with the timing value in the compare register. The current timing value in the compare register is then discarded, and the next timing value in sequence is retrieved into the compare register. In a first embodiment, timing values are stored in a hardware stack. These values then "roll down" into the compare register as the clock register reaches successive timing values. In a second embodiment, the stack is configured in extensible memory. A third embodiment of the invention uses non-linear memory storage techniques, such as those used with a linked list, to generate the sequence of timing values that will be successively loaded into the compare register.

24 Claims, 3 Drawing Sheets

IRREGULAR INTERVAL TIMING

CROSS-REFERENCE TO RELATED APPLICATION

This application is related to co-assigned, co-filed U.S. Patent Application Ser. No. 09/122,631, Ellis K. Cave, "REPETITIVE INTERVAL TIMING," which is incorporated herein by reference.

TECHNICAL FIELD

This invention relates generally to timing mechanisms within computers, and more specifically to an irregular interval timing system and method that allow multiple irregular intervals to be timed concurrently with a high degree of chronometric accuracy over prolonged periods of interval time.

BACKGROUND

Figure 1:
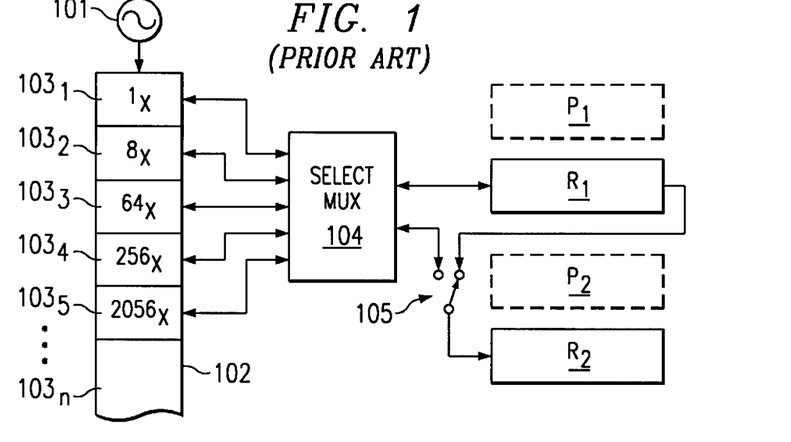
FIG. 1 illustrates an exemplary multi-event timing mechanism as typically found in systems of the current art.

Timing mechanisms in computers of the current art typically conform generally to the architecture and topology depicted in FIG. 1. High-speed clock 101 (typically generating ticks in microseconds or nanoseconds) feeds prescaler 102, whose ports 103 scale down increments of raw clock ticks to increasingly coarser intervals. In the example of FIG. 1, successive ports $103_1$ through $103_n$ scale down increments of raw clock ticks to selected intervals increasing by some power of two (in the case of FIG. 1, intervals of $2^3$, or 8).

Timing operations are then enabled by placing values in registers R. The actual values represent numbers from which the mechanism counts down to zero. When zero is reached from a desired value, a processor interrupt is generated.

Select mux 104 selects the prescaler port 103 whose interval will dictate the rate at which raw counting takes place in register R. The time until processor interrupt for a particular selected value in R is thus the time to count down to zero from that value in R at the interval corresponding to the particular prescaler port 103 selected by mux 104.

With further reference to the current art example of FIG. 1, recurring values (to generate a series of equidistant timed events) are optionally placed into registers R via phantom registers P. Instead of counting down to zero each time from a separate new value, a recurring value is loaded once into the phantom register P corresponding to R.

Then, as R reaches zero, a processor interrupt occurs, whereupon phantom register P reinitializes R for a further recurring counting cycle.

A further feature of the current art as illustrated in FIG. 1 is the optional capability to concatenate registers $R_1$ and $R_2$ when additional length is required to count down from a number exceeding the capacity of original register R. This situation typically arises when it is desired to time a fairly long event at a relatively fine counting interval on prescaler 102, where the value to be counted from exceeds the capacity of register $R_1$. In such cases, the prior art as illustrated in FIG. 1 may optionally provide selector 105, where register $R_2$ can be temporarily concatenated with register $R_1$. When not required, selector 105 re-establishes register $R_2$'s connection to mux 104 so that $R_2$ can perform timing operations independently.

Current art timing mechanisms such as the one illustrated in FIG. 1 are primarily useful when the system requires the same interval to be timed repeatedly. For example, the mechanism of FIG. 1 lends itself to timing the system's "heartbeat" interval. The heartbeat value to be repeated is loaded into phantom register P just once, at which point the mechanism times sequential intervals corresponding to that value.

A problem arises, however, if it is desired to time multiple irregular intervals concurrently. The advantage of repetition via phantom register P is lost. Multiple individual timing mechanisms become necessary, one for each irregular interval to be timed. A computer in which many events are occurring on asynchronously or irregularly timed cycles will thus require an inordinate amount of hardware devoted to this activity. While it is possible to time two or more asynchronous events off one register, this must be done by calculating intervening "delta" values to enable processor interrupts at the correct time. This generates unnecessary processing overhead.

Some current systems compromise by trying to do timing as much as possible off the heartbeat. This will be readily seen to be disadvantageous. The available timing resolution is immediately coarsened to the heartbeat interval. Accelerating the heartbeat interval to improve resolution generates a geometric increase in processing overhead.

Another disadvantage of current art timing systems such as described with reference to FIG. 1 is that in selecting a register R to load to a value of V, a compromise must be made of timing resolution against size of register that can hold the actual value of V. If a long period is required to be timed with a high degree of accuracy, then a large value of V will be required to be loaded in a register R whose prescaler port 103 counts down with fine resolution. When multiple timing mechanisms are used for timing multiple long timing intervals with a high resolution, then multiple large registers are required. At some point, even with the capability to concatenate registers, hardware constraints place a limit on the size of the multiple large registers that will in turn limit the size of value V that can be loaded. This places an upper limit of time interval that can be timed to that degree of accuracy.

There is therefore a need in the art for an irregular interval timer that may measure multiple irregular or asynchronous intervals concurrently and still require comparatively little hardware in deployment. Ideally, the amount of hardware available should not be a practical limitation on the number of events that may be timed concurrently. Also, there should not be a hardware-imposed practical limitation on the length of a time period that may be timed at a high level of resolution.

SUMMARY OF THE INVENTION

These and other objects, features and technical advantages are achieved by the present invention, which has one large register that increments ticks of a high-speed clock. It will be noted that the present invention advantageously counts upwards, whereas the preference in prior timing mechanisms has been to count down to zero.

Advantageously, the clock or counting register of the present invention is as large as needed to count, without "rolling over," for at least the longest period likely to be measured by the processing system in which it is deployed. For example, a 48-bit register can increment raw ticks of a 1 nanosecond clock for almost eight hours before "rolling over." If longer periods are required, a longer register may be used, a prescaler may be used, or alternatively processing may be deployed to give additional functionality to account for a clock that has "rolled over."

Preferred embodiments of the present invention advantageously deploy no prescaler with the large register incrementing clock ticks. It will be appreciated, however, that the invention is not limited in this regard, and that a prescaler may optionally be used to time extremely long intervals within physical limitations of the inventive single large register.

According to the present invention, a single compare register is also associated with the clock register, the compare register preferably being of equivalent length to the clock register. The compare register may be a separate register or the bottom register in a "stack" of registers configured in either hardware or software. Depending on the embodiment deployed, hardware or memory stores chronologically ordered timing values and supplies them in sequence to the compare register. A comparator monitors the clock register's current value and compares it with the timing value currently loaded in the compare register. As the clock register's value reaches the current timing value in the compare register, an alert signal (e.g., a processor interrupt or some other reason for setting a timing value) is generated and sent out with a corresponding event ID ("EID") associated with the timing value in the compare register. The current timing value in the compare register is then discarded, and the next timing value is loaded into the compare register.

A first embodiment of the invention enables the invention primarily in hardware. Timing values are loaded into a register stack as they arrive to be timed. The hardware then "moves" the new timing values down the stack until each new timing value finds its place in chronological order. Preferably, "moving" is accomplished by a simple controller, without software, which compares a new timing value with the one below it in the stack. If the one below is larger, then the two are interchanged. When the value below is the same or smaller, the new value is left where it is. It should be noted that if there are two or more values in the stack that are the same, the ones that are higher in the stack will generate slightly delayed interrupts due to the processing of the equivalent values that are lower in the stack. Therefore, the comparator preferably generates an interrupt if the value in the clock register is equal to or greater than the value in the compare register.

The compare register is identified as the register at the bottom of the stack, i.e., "smallest first." Alternatively, a separate compare register is loaded with values from the bottom of the stack. The stack then "rolls down" as the clock register reaches successive timing values loaded into the compare register. As new events to be timed reach the stack during processing, the controller moves them to their correct place in sequence, so that the timing values always "roll down" to the compare register in chronological order.

Event IDs in the first embodiment are either loaded with their corresponding timing value in the stack registers (EID values being ignored for the purposes of sorting and counting), or are kept in separate, smaller registers and are, associated with the timing values to which they correspond.

A second embodiment is similar to the first embodiment described above, except that in the second embodiment, the stack is embodied in configurable memory. While potentially running slightly slower and generating higher processing overhead than the first embodiment, the second embodiment requires less hardware and so is therefore likely to be less expensive to build. Also, a hardware implementation is limited physically by the register allocation. In a memory implementation potentially any number of events may be timed because of the flexible nature of memory to configure a stack of any size.

A third embodiment of the invention again uses memory controlled by software, except that instead of using a stack, the third embodiment uses non-linear storage techniques, such as used in a linked list, to generate the sequence of timing values that will be successively loaded into the compare register. In this embodiment, the need for a linear "stack" of memory is obviated, the sequence of timing values is instead stored in a non-linear fashion and linked together by pointers to successive memory addresses. This linked list embodiment is particularly advantageous in implementations where new irregular intervals are frequently inserted during timing operations. In such cases, new timing values (representing the new intervals) will frequently have to be inserted in chronological order into the sequence waiting to be timed. In a linear stack implementation this will involve frequent mass movement of data in the stack to make room for the new timing values. The non-linear storage feature of a linked list embodiment, however, allows new timing values to be inserted in chronological sequence without disturbing other values previously stored because only pointer values are changed.

This advantage of a linked list embodiment is nonetheless not without a trade-off. While the linked list embodiment simplifies insertion processing overhead, sort processing is increased over a stack implementation. Stacks may use a binary search algorithm to find a new timing value's place in chronological order, while a linked list embodiment generally will use a slower search algorithm, such as scanning all timing values in sequence until the correct place is found. The selection of a stack embodiment over a linked list embodiment is thus on a case-by-case basis in order to achieve optimal performance of the invention. The techniques for searching values and inserting values in a stack, list or hash table are well established in the prior art, and all such techniques are considered to be within the scope of the present invention.

Regardless of the embodiment of the invention selected, the compare register should be able to put its current value back in at the bottom of the stack when necessary, or place its current value back into a retrievable memory location when necessary. The compare register should be able to do this in the event that a new timing value arrives during processing that is the next timing value chronologically to be reached, and therefore represents the most recent event currently being timed. In such an event, the new timing value should also go straight to the compare register. The compare register should in turn suspend its current value, placing it either back in the stack, or possibly in temporary storage.

It is therefore a technical advantage of the present invention to be able to time multiple irregular intervals concurrently without having to set multiple individual timers each corresponding to a separate interval. A single counter concurrently times all intervals regardless of relative irregularity or asynchronicity.

It is a further technical advantage of the present invention to be able to continue to time multiple irregular intervals to a high resolution. Timing is not tied to a heartbeat interval. Moreover, as noted above with reference to the current art as illustrated in FIG. 1, existing systems employ prescaler 102 to conserve register space by reducing the counting resolution for long time intervals. However, by its nature, prescaler 102 inherently reduces the resolution to which such long intervals can be timed. The present invention removes this limitation. All intervals are timed with the same resolution, advantageously the raw clock tick interval (unless a prescaler is deliberately deployed).

Thus, even timed intervals near the end of the clock register's capacity can be timed with the same resolution as comparatively short intervals.

It is a further technical advantage of the present invention to use less hardware and more memory to implement timers, especially in the second and third embodiments as described above. The need for prescaler hardware becomes optional. Further, it will be appreciated that in modem computer architecture, memory is much cheaper to manufacture and manage than hardware registers and their associated circuitry. Moreover, the flexible nature of memory allows stacks of any size to be configured, whereas in hardware, the stack configuration must be predesigned as a fixed selection.

It is a still further advantage of the third embodiment of the present invention to use non-linear storage techniques to further enhance mass storage economy and efficiency when appropriate to do so in view of the underlying system's timing requirements.

A yet further advantage of the present invention is that by counting up, instead of counting down as is prevalent in the current art, the invention obviates certain processing overhead associated with timing interval calculation. It will be appreciated that counting down effectively compels a "one register, one timed event" deployment in that "delta" values must be calculated to identify intervening timed intervals in downward counting mode. For example, a register counting down from 100 must trigger a processor interrupt at 70 if an intervening interval of 30 is required to be timed. As a result, current art systems have tended to allocate a discrete register to each timed event rather than incur the processing overhead of calculating "delta" values.

In contrast, the upward counting mode of the present invention facilities timing multiple intervals with a unitary register. No "delta" values are required to be calculated, since the count value representing each interval will have elapsed as the counter reaches this value during its continuing upward count. Repeating the foregoing example, a register in the present invention will trigger a processor interrupt at 30, the desired intervening interval, on its way to counting up to 100. Calculation of the "delta" value of 70 is not necessary.

Preferably the source (e.g., program, code, application, task, module or operating system) requesting a timing interrupt will provide the absolute value of the time at which the interrupt is needed, based on the clock register (e.g., provide an interrupt when the value in the clock register equals 5400). As discussed, no "delta" calculation is necessary for this request. Some sources, however, may request a timing interrupt by providing a relative timing value (e.g., 100 counts from now). While this type of request can be handled by the present invention, it does require the additional overhead of adding the provided relative value to the current value of the clock register in order to generate the absolute value to be inserted into the stack.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 2A:
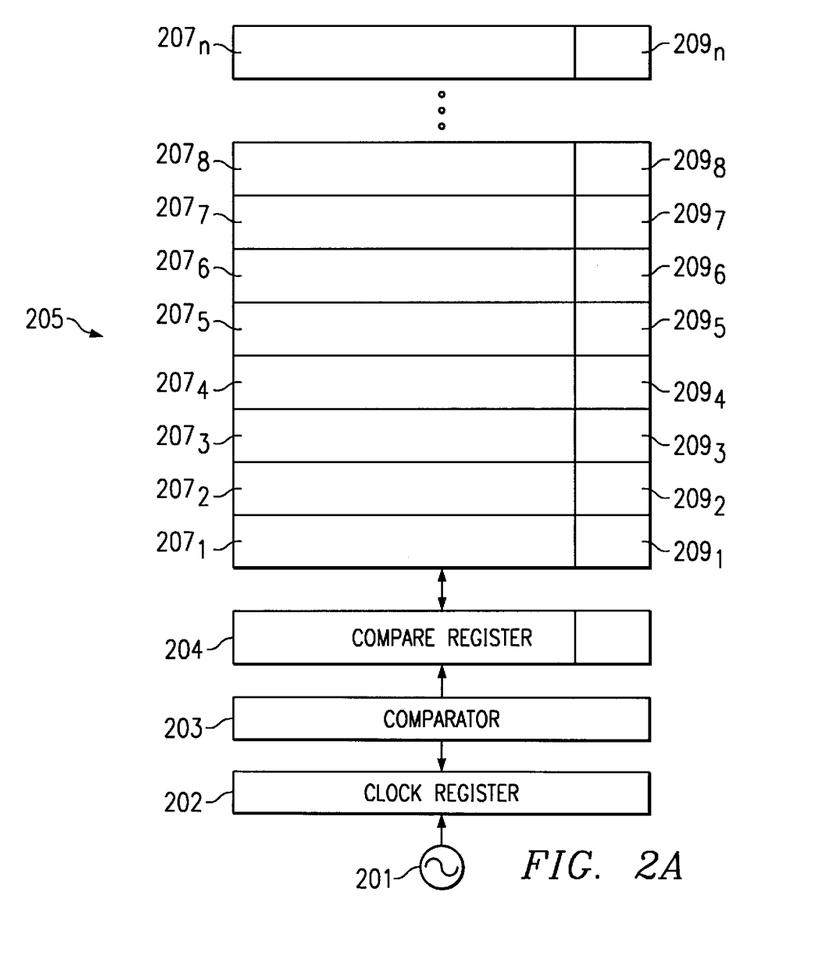
FIG. 2A illustrates the inventive timing mechanism deployed using stack 205 enabled in hardware in a first embodiment and memory in a second embodiment.

FIG. 2A illustrates the inventive timer in block diagram form according to a first embodiment implemented primarily in hardware. Clock register 202 increments at the raw tick rate of high speed clock 201. The length of clock register 202 is advantageously selected such that it can meet the timing interval requirements of the application in which it is to be deployed without rolling over. For example, a 48-bit clock register 202 can increment in ticks of a 1 nanosecond clock 201 for almost eight hours before rolling over. A 64-bit clock register 202 can increment in ticks of a 1 nanosecond clock for over five hundred and eighty years before rolling over. Both 48-bit and 64-bit registers 202 in combination with a 1 nanosecond clock 201 are well within the purview of current hardware capability. The length of clock register 201 is therefore advantageously selected according to the timing interval requirements of the application in which the inventive mechanism is to be deployed. Alternatively, a prescaler may be deployed (not illustrated), although, as described above, fine counting resolution over long timing intervals will be inhibited when the prescaler is used.

Of course, it will be appreciated that rollover of clock register 202 does not render the present invention inoperable. In fact, when the inventive mechanism is deployed in existing systems, it is quite possible that rollover will in fact occur due to original hardware design constraints. When rollover may be expected to occur, however, additional control and management overhead is required, which overhead is obviated when the length of clock register 202 is originally selected to be long, enough not to roll over.

Referring again to FIG. 2A, compare register 204 is a register preferably having a length equivalent to that of clock register 202. FIG. 2A also shows stack 205 associated with compare register 204. While illustrated in FIG. 2A as separate and additional to stack 205, it will be appreciated that compare register 204 may also be configured as the "bottom" register in stack 205 (i.e., register 207, as illustrated in FIG. 2A).

In a first embodiment of the invention as illustrated in FIG. 2A, stack 205 comprises a series of hardware registers $207_1$ through $207_n$, each including register spaces $209_1$ through $209_n$ reserved for a corresponding EID value as described below.

Figure 2B:
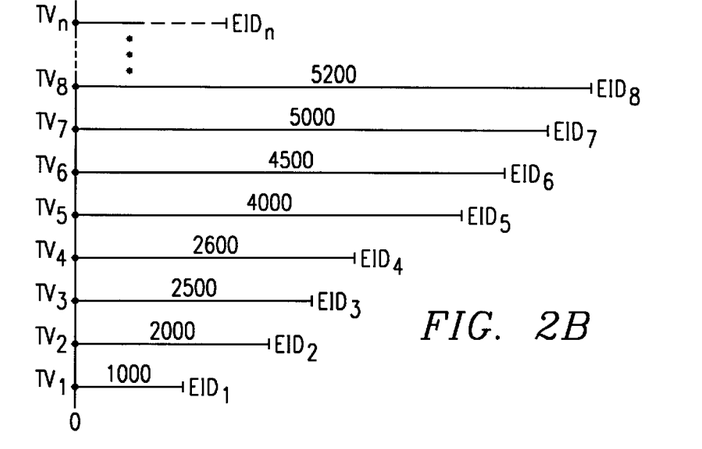
FIG. 2B illustrates a series of timing values $TV_1$–$TV_n$, with associated $EID_1$–$EID_n$, representing intervals to be timed substantially concurrently in a processor on which the invention is enabled.

Turning now to FIG. 2B, the system on which the inventive mechanism is deployed has previously identified a series of timing values $TV_1$ through $TV_n$. Each timing value $TV_1$ through $TV_n$ represents an interval that is desired to be timed within the system. The actual numeric value of each timing value $TV_1$ through $TV_n$ is the number of raw clock ticks of clock 201 in FIG. 2A elapsing in the corresponding interval to be timed. It will also be seen in FIG. 2B that each timing value $TV_1$ through $TV_n$ is associated with corresponding $EID_1$ through $EID_n$, each EID representing an event to occur upon the elapse of the timing value $TV_1$ through $TV_n$ with which it is associated.

Figure 2C:
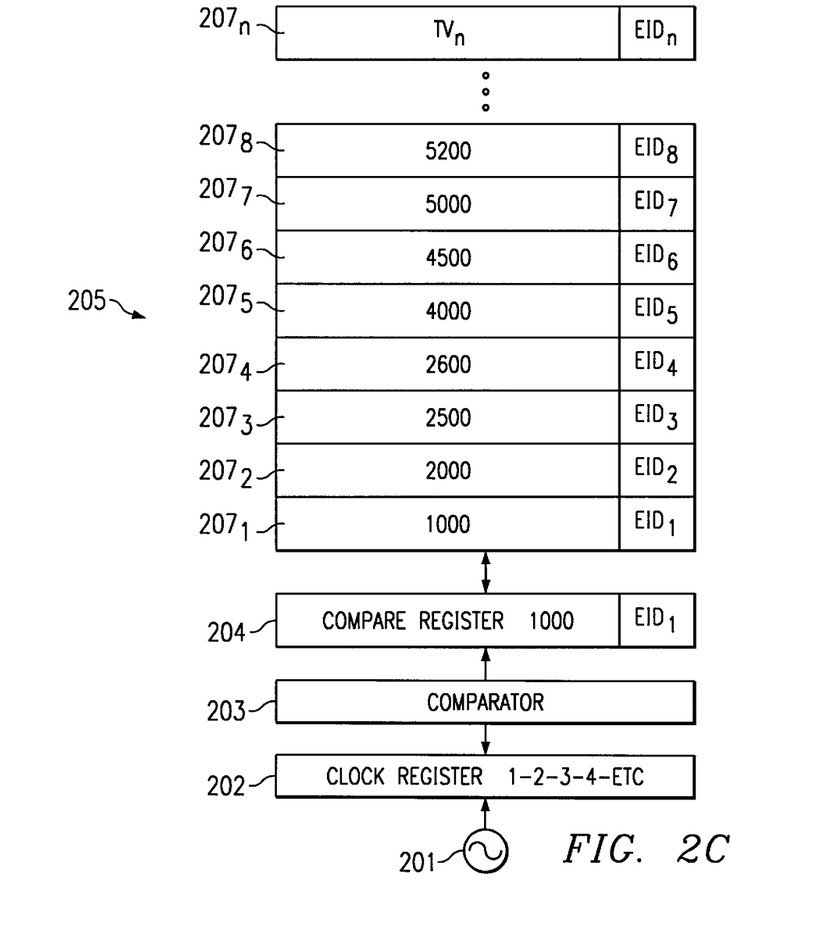
FIG. 2C illustrates the series of FIG. 2B implemented on the mechanism of FIG. 2A.

With reference now to FIG. 2C, the timing values $TV_1$ through $TV_n$ and corresponding EIDs of FIG. 2B are loaded into stack 205. Timing values $TV_1$ through $TV_n$ may be initially loaded having previously been sorted in chronological order, or alternatively a controller (not illustrated) may load them into the correct "chronological" register 207 without prior sorting. Such a controller simply receives a new timing value $TV_1$ through $TV_n$, and, for example, starting at either the top or bottom of stack 205, or using a binary search, compares the timing value with values already loaded until the correct place in the stack is found. Values in registers 207 above the correct place are each then shifted up one place in stack 205 to make room for new value.

Timing operations begin as clock register 202 counts upward at the clock rate of clock 201. Comparator 203 continuously compares the current value of clock register 202 with the current timing value loaded into compare register 204. When clock register 202 reaches the value in compare register 204, a processor interrupt is generated and the system acts according to the EID associated with the timing value currently loaded in compare register 204 (processor interrupt not illustrated).

Stack 205 then "rolls down," making the next register 207's timing value current in compare register 204. Meanwhile, counting in clock register 202 and comparison between clock register 202 and compare register 204 continues substantially continuously and uninterrupted. When clock register 202 reaches the new timing value currently loaded into compare register 204, a processor interrupt is again generated to trigger system action according to the corresponding EID for the timing value just reached (processor interrupt again not illustrated). Stack 205 then again "rolls down," making the next register 207's timing value current in compare register 204. The inventive mechanism continues until all intervals represented by timing values $TV_1$ through $TV_n$ as stored in stack 205 have been timed, and their corresponding EIDs have been activated.

It will be appreciated that new timing values and associated EIDs may arrive to be timed while the inventive mechanism is in operation as just described. In this case, the controller (not illustrated) finds the incoming timing value's correct place in chronological sequence in stack 205. Timing value in registers 207 (with associated EIDs) are then each moved up to make room for the incoming timing value and EID.

It may also be that the incoming timing value represents an interval that is even more recent than the interval represented by the current timing value loaded into compare register 204. The controller (not illustrated) will detect this if it is unable to place the incoming timing value in stack 205 above the timing value currently loaded in compare register 204. In this case, the incoming timing value must go straight into compare register 204, replacing temporarily the current timing value stored there. When this happens, compare register 204 may place its current timing value temporarily back into stack 205, or put it into temporary storage.

The advantages of the present invention will thus be appreciated. Multiple irregular intervals may be timed concurrently with substantially less hardware than systems of the current art as described above with reference to FIG. 1. Moreover, since timing values $TV_1$, through $TV_n$ in FIGS. 2A, 2B and 2C are always compared with clock register 202 at the highest resolution available from clock 201, the resolution to which any interval is timed by the inventive mechanism is always the highest available. This is in distinction to the loss of resolution for long intervals caused by prescaler 102 in systems of the current art as exemplified in FIG. 1.

A second embodiment of the present invention may be appreciated with further reference to FIGS. 2A, 2B and 2C, by visualizing stack 205 as a configurable and extensible memory region. In such an embodiment, the placement and sorting of timing values in stack 205 embodied as memory may be enabled be either hardware or software. The advantage of using a configurable and extensible memory region for stack 205 in this second embodiment is that the size and height of stack 205 is limited only by the amount of available memory. This is in contrast to the first embodiment described earlier, in which stack 205 comprises hardware registers, placing inevitable physical limitations on its size and height. The comparative disadvantage of the second embodiment, having a memory stack, over the first embodiment, having a hardware stack, is that processing overhead may be higher with a memory stack if software control is used to a substantial degree. Different applications of the inventive mechanism will dictate the most advantageous selection between these first and second embodiments.

Figure 3:
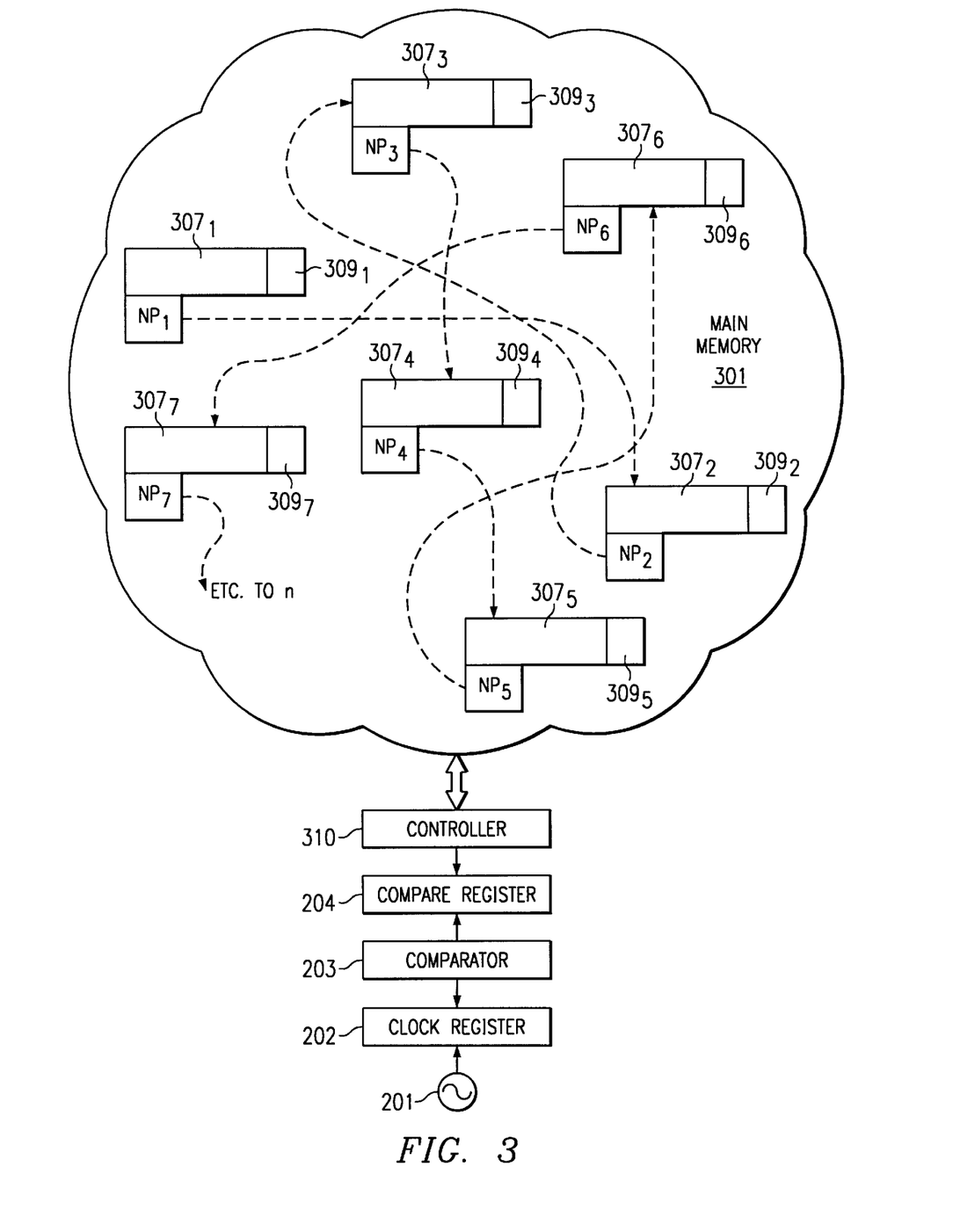
FIG. 3 depicts the inventive mechanism deployed according to a third embodiment using non-linear memory storage techniques.

If frequent insertion of new timing values is anticipated, it may also be advantageous to use a third embodiment of the present invention, as illustrated in FIG. 3. In this third embodiment, non-linear storage techniques (such as typically used to implement a "linked list") allow the present invention to be enabled without any "stack" like memory configuration at all. Instead, all timing values as randomly stored in main memory are linked by a series of "next" pointers, each stored with the corresponding timing value and associated EID in main memory. As a result, once the original sequence of timing values has been identified, subsequent insertion of new timing values requires very little, if any, mass movement of data within memory. The trade-off of using the embodiment as shown in FIG. 3 is that the processing overhead incurred by controller 310 in FIG. 3 is generally higher than in other embodiments described herein. In particular, in contrast to embodiments using stacks, efficient binary sorting algorithms are generally unavailable to locate the points in the linked list at which new timing values should be inserted to maintain chronological order. This additional sorting processing overhead may be worth absorbing, however, if frequent inserting, of new timing values into the sequence is anticipated.

With reference to FIG. 3, main memory 301 includes timing values $307_1$–$307_n$ stored randomly therein, each with corresponding EIDs $309_1$–$309_n$. It should be noted that while seven timing values $307_1$–$307_n$ are identified in main memory 301 in FIG. 3, the embodiment of the invention is not limited in this regard.

In FIG. 3, each timing value $307_1$–$307_n$ also has a corresponding next pointer value $NP_1$–$NP_n$ associated with it in main memory. The value of NP for a particular timing value 307 points to the address in main memory where the next timing value in sequence is stored. Next pointer values NP for timing values 307 are set by controller 310 when timing values are stored in main memory, once controller 310 has sorted the timing values $307_1$–$307_n$ into sequence. It will be seen in FIG. 3 that in this embodiment, controller 310 may retrieve timing values $307_1$–$307_n$ in sequence by next pointer value, and then load that timing value directly into compare register 204.

In FIG. 3, when a new timing value arrives to be inserted into the sequence, it may be stored randomly in memory. Controller 310 then simply scans down the sequence to determine the correct place in sequence for the new value, and then adjusts or sets next pointer values accordingly. The original timing value in sequence immediately before the new timer value has its next pointer value adjusted to point to the memory location of the new timing value. The next pointer value of the new timing value is set to point to the memory location of the original timing value in sequence immediately after the new timing value.

As noted, while the embodiment of FIG. 3 facilitates insertion of new timing values, the attendant additional sorting processor overhead may make the embodiment of FIG. 3 most advantageous only when many insertions of new timing values are anticipated. In addition, it will be appreciated that there are many types of linked list data structures known in the art which could be substituted for the one illustrated in FIG. 3, all of which are within the scope of the present invention.

The foregoing description has described various embodiments with reference to particular exemplary hardware or software deployments. It will be appreciated, however, that the invention is not limited in this regard, and that many alternative hardware or software deployments of the various aspects of the invention are possible with equivalent enabling effect. For example, if desired, the invention may be embodied entirely in hardware, firmware, software, or a combination thereof. Although the clock speed of the invention deployed entirely in software would likely be much slower than in hardware (at best, perhaps a millisecond tick rate under current art capability), the invention would still be enabling on selected applications operable with such a coarse timing resolution.

As another example, the present invention may be embodied using discrete components, or on an integrated circuit, such as a complementary metal-oxide silicon ("CMOS") design, either as an independent Application Specific Integrated Circuit ("ASIC") chip, or as part of a larger piece of hardware. In addition, the present invention may be used in any application in which multiple irregular intervals are timed, for example, a stand alone computer (e.g., in a personal computer) or in an embedded computer system (e.g., in a toy that gradually learns over an extended period of time).

Although the present invention and its advantages have been described in detail, it should be understood that various changes, substitutions and alterations can be made herein without departing from the spirit and scope of the invention as defined by the appended claims.

What is claimed is:

1. A method for timing multiple irregular time intervals comprising the steps of:
    (a) periodically receiving numerical timing values, each of the values representing an irregular time interval as a point in time from a datum on a linear scale;
    (b) maintaining the numerical timing values in ascending numerical order, said order including a current low value;
    (c) continuously incrementing a clock register;
    (d) continuously comparing the clock register with the current low value;
    (e) generating an alert signal when the clock register number is equal to or greater than the current low value;
    (f) following step (e), discarding the current low value in favor of the current next lowest value in said order; and
    (g) repeating steps (d), (e) and (i) for as long as said order continues to contain numerical values.

2. The method of claim 1 in which the clock register is incremented by raw ticks of a clock.

3. The method of claim 1 in which the clock register is incremented by prescaled ticks from a prescaler, wherein the prescaler receives raw ticks from a clock and generates prescaled ticks at a desired tick rate.

4. The method of claim 1, wherein step (c) comprises the steps:
    (i) starting the clock register at a value of 0;
    (ii) incrementing the clock register by one unit upon receiving a tick;
    (iii) repeating step (ii) until the clock register obtains a maximum value; and
    (iv) resetting the clock register to a value of 0 upon receiving the next tick.

5. The method of claim 1, in which step (b) comprises the step:
    (i) adjusting the numerical timing values in the ascending numerical order to allow for a received numerical value that will not be obtained until the clock register resets.

6. The method of claim 1, in which step (b) comprises the step:
    (i) checking the received numerical timing value against the current low value, wherein when the received numerical timing value is numerically smaller than the current low value making the current low value a temporary value and making the received numerical timing value the current low value.

7. The method of claim 6, wherein when the checking step resulted in the temporary value, making the temporary value the current low value after the current low value generates the alert signal.

8. The method of claim 1, in which step (b) comprises:
    (i) checking the received numerical timing, value against the current low value, wherein when the received numerical timing value is numerically smaller than the current low value interchanging the current low value and the received numerical timing value, making the current low value the received numerical timing value and making the received numerical timing value the current low value.

9. The method of claim 1, in which step (b) comprises:
    (i) making the received numerical timing value the current low value when there is no current low value.

10. The method of claim 1, wherein step (b) comprises the steps of:
    (i) adding the received numerical timing value to the end of the ascending numerical order; and
    (ii) sequencing the ascending numerical order, the sequencing step comprises:
        (A) comparing the received numerical timing value with a value ahead of the received numerical timing value in the ascending numerical order, wherein when the value ahead of the received numerical timing value is larger than the received numerical timing value reordering the two numbers;
        (B) repeating step (A) until the value ahead of the received numerical timing value is equal to or less than the received numerical timing value.

11. The method of claim 10, wherein the ascending numerical order is stored in the form of a linear storage technique in hardware.

12. The method of claim 10, wherein the ascending numerical order is stored in the form of a linear storage technique in configurable memory.

13. The method of claim 10, wherein the ascending numerical order is stored in the form of a non-linear storage technique.

14. An irregular interval timer comprising:
   a clock register, including a clock register value incremented by repetitive ticks;
   a compare register, including a compare register value and a corresponding event ID;
   a comparator coupled to the clock register and the compare register, wherein the comparator continuously compares the clock register value with the compare register value and generates an alert signal with the corresponding event ID when the clock register value is equal to or greater than the compare register value; and
   a storage device coupled to the compare register, wherein the storage device actively maintains numerical values representing irregular time intervals and corresponding event IDs in ascending numerical order.

15. The timer of claim 14, further comprising:
   a clock coupled to the clock register, wherein the clock generates repetitive raw ticks.

16. The timer of claim 14, further comprising:
   a clock; and
   a prescaler coupled to the clock and clock register, wherein the prescaler receives repetitive raw ticks from the clock and prescales the repetitive raw ticks at a desired tick rate.

17. The timer of claim 14, wherein the storage device comprises:
   a linear memory device having a first plurality of records for storing irregular time interval information and a second plurality of records for storing event IDs, wherein the first and second plurality of records are coupled.

18. The timer of claim 17, wherein a first record in the first plurality of records and a first record in the second plurality of records are utilized by the compare register.

19. The timer of claim 14, wherein the storage devices comprises:
   a linear memory device having a plurality of records for string irregular timing value information and event IDs.

20. The timer of claim 14, wherein the storage device comprises:
   a controller coupled to the compare register;
   a nonlinear memory device coupled to the controller, including a first plurality of records for storing irregular time interval information, a second plurality of records for storing event IDs, and a third plurality of records for storing next pointers, wherein the controller actively maintains the non-linear storage device to have the numerical values with corresponding event IDs and corresponding pointers be in ascending numerical order.

21. A method for timing multiple irregular time intervals comprising the steps of:
   (a) periodically receiving predefined numerical values, each of the values representing an irregular time interval as a point in time from a datum on a linear scale;
   (b) maintaining the numerical values in ascending numerical order, said order including a current low value, the ascending numerical order being stored in the form of a linear storage technique in hardware, each numerical value having a corresponding event ID, each numerical value being stored in one register and the corresponding event ID being stored in another register, said step (b) comprising:
      (i) making the received numerical value the current low value when there is no current low value;
      (ii) checking the received numerical value against the current low value, wherein when the received numerical value is numerically smaller than the current low value interchanging the current low value and the received numerical value making the current low value the received numerical value and making the received numerical value the current low value;
      (iii) adding the received numerical value to the end of the ascending numerical order; and
      (iv) sequencing the ascending numerical order, said sequencing step comprising:
         (A) comparing the received numerical value with a value ahead of the received numerical value in the ascending numerical order, wherein when the value ahead of the received numerical value is larger than the received numerical value reordering the two numbers;
         (B) repeating step (A) until the value ahead of the received numerical value is equal to or less than the received numerical value;
   (c) continuously incrementing a clock register by raw ticks generated from a high-speed clock;
   (d) continuously comparing the clock register with the current low value;
   (e) generating an alert signal with the corresponding event ID when the clock register number is equal to or greater than the current low value;
   (f) following step (e), discarding the current low value in favor of the current next lowest value in said order; and
   (g) repeating steps (d), (e) and (f) for as long as said order continues to contain numerical values.

22. An irregular interval timer comprising:
   a high-speed clock;
   a clock register coupled to the high-speed clock, including a clock register value incremented by repetitive ticks from the high-speed clock;
   a compare register, including a compare register value and a corresponding event ID;
   a comparator coupled to the clock register and the compare register, wherein the comparator continuously compares the clock register value with the compare register value and generates an alert signal with the corresponding event ID when the clock register value is equal to or greater than the compare register value; and
   a linear storage device in hardware coupled to the compare register, wherein the linear storage device actively maintains numerical values and corresponding event IDs in ascending numerical order.

23. An irregular interval timer comprising:
   a high-speed clock;
   a prescaler coupled to the high-speed clock, the prescaler receiving repetitive raw ticks from the clock and prescaling the repetitive raw ticks at a desired tick rate;
   a clock register coupled to the prescaler, including a clock register value incremented by the repetitive ticks from the prescaler;

a compare register, including a compare register number, wherein the compare register number is the combination of a compare register value and a corresponding event ID;

a comparator coupled to the clock register and the compare register, the comparator continuously compares the compare register value with the clock register value and generates an alert signal with the corresponding event ID when the clock register value is equal to or greater than the compare register value; and a linear storage device in configurable memory, coupled to the compare register, wherein the linear storage device actively maintains numerical values and corresponding event IDs in ascending numerical order.

24. An irregular interval timer comprising:

a high-speed clock;

a clock register coupled to the high-speed clock, including, a clock register value incremented by repetitive ticks from the high-speed clock;

a compare register, including a compare register value and a corresponding event ID;

a comparator coupled to the clock register and the compare register, wherein the comparator continuously compares the clock register value with the compare register value and generates an alert signal with the corresponding event ID when the clock register value is equal to or greater than the compare register value; and a controller coupled to the comparator; and a non-linear storage device coupled to the compare register, including a first plurality of records for storing timing values, a second plurality of records for storing event IDs, a third plurality of records for storing next pointers, wherein the controller actively maintains the non-linear storage device to have the numerical values with corresponding event IDs and corresponding pointers be in ascending numerical order.

* * * * *

UNITED STATES PATENT AND TRADEMARK OFFICE
CERTIFICATE OF CORRECTION

PATENT NO.    : 6,232,808 B1
DATED         : May 15, 2001
INVENTOR(S)   : Ellis K. Cave It is certified that error appears in the above-identified patent and that said Letters Patent is hereby corrected as shown below:

Column 5,
Line 8, delete "modem" and insert -- modern --

Column 10,
Line 7, delete "( i )" and insert -- ( f ) --

Column 11,
Line 47, delete "string" and insert -- storing --

Signed and Sealed this

Twenty-ninth Day of July, 2003

JAMES E. ROGAN
*Director of the United States Patent and Trademark Office*